United States Patent [19]

Chablaix et al.

US005520946A

[11] Patent Number: 5,520,946
[45] Date of Patent: May 28, 1996

[54] PREPARATION OF OVERRUN MILK PRODUCT

[75] Inventors: René E. Chablaix, Lausanne; Marlène Gaugaz, Corseaux, both of Switzerland

[73] Assignee: Nestec S.A., Vevey, Switzerland

[21] Appl. No.: 400,277

[22] Filed: Mar. 3, 1995

Related U.S. Application Data

[63] Continuation of Ser. No. 162,854, Dec. 6, 1993, abandoned.

[30] Foreign Application Priority Data

Jan. 9, 1993 [EP] European Pat. Off. .............. 93100249

[51] Int. Cl.$^6$ ....................................................... A23J 3/00
[52] U.S. Cl. .......................... 426/570; 426/522; 426/524; 426/564; 426/580; 426/585
[58] Field of Search .............................. 426/94, 570, 100, 426/101, 519, 520, 521, 522, 524, 564, 565, 567, 570, 571, 572, 580, 585, 586, 587, 588

[56] References Cited

U.S. PATENT DOCUMENTS

| | | |
|---|---|---|
| 3,078,167 | 2/1963 | Rice . |
| 4,871,573 | 10/1989 | Bohren et al. . |
| 5,135,768 | 8/1992 | Campbell et al. .................. 426/570 X |

FOREIGN PATENT DOCUMENTS 2057848  4/1981  United Kingdom .

*Primary Examiner*—Leslie Wong
*Attorney, Agent, or Firm*—Vogt & O'Donnell

[57] ABSTRACT

An overrun milk product is prepared by combining whole milk and skimmed milk powder to obtain a milk composition, inoculating the milk composition with microcrystalline lactose, admixing at least one sugar with the inoculated composition and heating the sugar-containing composition for a time and at a temperature sufficient to obtain a pasteurized aqueous phase. The pasteurized aqueous phase is admixed with a fatty phase at a temperature sufficient to form an emulsion, and the emulsion is overrun.

18 Claims, No Drawings

PREPARATION OF OVERRUN MILK PRODUCT

CROSS REFERENCE TO RELATED APPLICATION

This application is a continuation application of Ser. No. 08/162,854, filed Dec. 6, 1993, now abandoned.

BACKGROUND OF THE INVENTION

This invention relates to a process for the production of a food product in the form of an overrun mass, to the overrun food product obtained and to a composite product containing the overrun food product as a filling.

French Patent No. 2 473 269 describes a process for the production of a sweetened protein-containing food product in the form of a foam-like plastic mass, which can be spread or cut into slices according to its consistency, comprising the following steps: Preparation at 55°–65° C. of an oil-in-water emulsion containing an aqueous phase—consisting of partly skimmed condensed milk having a particular viscosity—and a fatty phase; pasteurization of the emulsion; inoculation at 45°–55° C. with microcrystals of lactose added in a quantity of 0.015 to 1% by weight; conversion of the emulsion thus inoculated into a foam by injection of an inert gas; and cooling to below 20° C. with mechanical beating of the foam to cause at least partial crystallization of the fats.

SUMMARY OF THE INVENTION

The present invention seeks to provide a food product containing a large quantity of milk in the form of an overrun mass which has a firm structure and unctuous texture and which is capable of retaining its properties in the event of prolonged storage at 8° to 15° C. while remaining microbiologically correct.

Accordingly, the present invention relates to a process for the production of a food product overrun mass, in which a first mixture containing whole milk and skimmed milk powder is prepared and then inoculated with lactose, at least one sugar is added to this inoculated first mixture, the second mixture thus obtained is heat-treated to form an aqueous phase, the aqueous phase thus obtained is mixed with a fatty phase at such a temperature that the fats present in the fatty phase are partly liquid so as to form an emulsion and the resulting emulsion is then overrun.

The invention also provides a food product overrun mass with a voluminal mass of 500 to 650 g/l and a penetrometry value of 3 to 20 mm, as measured at 11° C.

The present invention further relates to the use of the overrun food product as a filling in a composite product additionally containing an oven-baked product.

Finally, the present invention also relates to the provision of a composite product consisting of at least two parts of oven-baked product separated by the said overrun food product.

One advantage of the present invention is that the overrun food product thus prepared has a frothy and highly aerated structure, a creamy, unctuous and smooth texture and clean lactic aromatic notes characteristic of fresh milk which distinguishes the product according to the invention from products produced from condensed milk, for example, which have a note reminiscent of "mail-lardisation" and are attended by the disadvantage of altering and/or masking the other notes developed. Another advantage of the invention is that the product obtained shows high physical, organoleptic and microbiological stability under storage at 8° to 15° C. Another advantage of the invention is that the product obtained is nutritionally balanced and rich in milk and may contain at least 50% starting materials of lactic origin and relatively little fat.

DETAILED DESCRIPTION OF THE INVENTION

In the present specification, percentages and parts are by weight.

In the process according to the invention, an aqueous phase, on the one hand, and a fatty phase, on the other hand, are prepared and then mixed under particular conditions to form an emulsion which is overrun to obtain the desired overrun food product.

To prepare the aqueous phase, a first mixture containing whole milk and skimmed milk powder is first prepared. The preparation of a mixture based on these constituents leads, on the one hand, to an end product with a particular aromatic note unaffected by additional heat treatment, for example concentration. On the other hand, since this starting mixture already consists of an emulsion, namely milk, it provides for the preparation of a stable and homogeneous oil-in-water emulsion which itself leads, after overrunning, to an overrun product of which the foam is firm, light, fine, smooth, dry and stable and which does not collapse, for example when it is cut. This first mixture may be agitated to obtain a homogeneous mass. Preferably, the mixture prepared can be subsequently pumped, but should not be excessively liquid. It should have a dry matter content of 60 to 70%, this dry matter content also influencing the viscosity and subsequent texture of the overrun mass. In addition, the temperature of the whole milk may be increased to 30°–50° C. before addition of the skimmed milk powder in order to improve homogenization.

The homogeneous mixture obtained is inoculated with microcrystalline lactose in order, correspondingly, to influence the crystallization of the lactose present in the mixture. Accordingly, 0.03 to 0.05% lactose may be added to the first mixture. Inoculation is preferably carried out at a temperature of the order of 15° to 30° C. The first mixture may optionally be stored for a certain time at 8° to 15° C. after inoculation.

A second mixture is then prepared by addition of at least one sugar to the inoculated first mixture. On the one hand, this enables the water activity value of the final overrun product to be reduced, thus providing the product with good keeping properties. On the other hand, it enables a firm foam capable of retaining its firmness during storage to be obtained. For example, a polysaccharide, sucrose and/or invert sugar may be added. A structuring agent, for example maltodextrin, or a whey protein isolate, may also be added so that the quantity of fatty phase to be mixed with the aqueous phase can also be reduced. To this end, the temperature of the inoculated first mixture may be increased to 30°–50° C. and the sugar added. After stirring, the structuring agent may optionally be added and the whole is then stirred for at least another 15 minutes at the temperature of 30° to 50° C. It is also possible to add flavourings, amino acids, mineral salts and/or vitamins to the mixture. This results in the formation of a second mixture which may be homogenized, for example, in a colloid mill.

The second mixture is then pasteurized by heat treatment for 45 to 80 seconds at 70° to 80° C., for example in a scraped-surface heat exchanger. The heat treated second-mixture may then optionally be inoculated a second time, preferably after its temperature has been reduced to 15°–30° C. The second inoculation ensures that the lactose, optionally dissolved during the heat treatment recrystallizes in the desired shape and size. The second inoculation may be carried out by adding the rest of the lactose microcrystals to the treated second mixture at a temperature kept at 15° to 30° C. In all, approximately 0.03 to 0.06% lactose, based on the final overrun product, may be added in one or two portions.

An aqueous phase in the form of a pumpable mass having a dry matter content of 60 to 70% is thus obtained and may be stored for a certain time at 8° to 15° C.

A fatty phase is also prepared. It is possible to use fats of vegetable origin, such as fractionated non-hydrogenated fats and cocoa butter and/or or fats of animal origin, such as butter oil, to obtain a fatty phase having the desired properties, i.e., being solid or semisolid up to approximately 10° C. and molten or liquid to approximately 35° C. Accordingly, the constituent compounds of the fatty phase are selected according to the desired properties and are then mixed. To this end, the temperature of the mixture of the various fats may be increased to around 60° to 65° C. to obtain a homogeneous fatty phase and to allow subsequent handling thereof, for example by pumping.

A emulsion is then prepared by mixing the fatty phase and the aqueous phase. To this end, the fatty phase or, optionally, the mixture of aqueous phase and fatty phase is heated to such a temperature that the fats are partly liquid, i.e., are still partly crystallized, so that a correct emulsion is obtained.

For example, a scrapped-surface heat exchanger may be used to reduce the temperature of the fatty phase to around 26°–29° C., the temperature depending upon the composition of the fatty phase. The aqueous phase is then heated to a temperature close to that of the fatty phase, for example to a temperature a few degrees, more particularly 1° to 4° C., below the temperature of the fatty phase, and then mixed with the fatty phase. In one particular embodiment of the invention, one part of fatty phase and two parts of aqueous phase are mixed to obtain an end product which, after overrunning, has a frothy and aerated structure, a creamy, unctuous and smooth texture and a dry, fine and stable appearance.

The resulting emulsion is then overrun, for example by the injection of an inert gas into the mass. Thus, nitrogen may be injected for 5 to 10 minutes at a temperature of 20° to 30° C., after which aeration may be continued by mechanical action, the temperature being reduced to 8°–15° C. which, on the one hand, enables adequate crystallization of the fats to be obtained and, on the other hand, good microbiological conditions to be maintained.

The food product obtained is in the form of an overrun mass of firm stable consistency of which the foam is fine and "holds" well, i.e., does not collapse and/or run after storage and/or handling, and which also has a creamy and unctuous texture in the mouth.

This product may also be defined by the following parameters:

voluminal mass: approx. 500–650 g/l penetrometry value at 11° C.: 3–20 mm for a hemispherical module weighing 148.5 g for 60 s.

This product generally has a water content of 23 to 30%, a fats content of 18 to 35% and a water activity of approximately 0.9.

It may be stored for a certain time at a temperature of 8° to 15° C.

The food product may then be used in the production of a composite product which also consists of at least two parts of oven-baked product between which the overrun food product is situated as a filling. The oven-baked product may be, for example, biscuit, Genoa pastry or a milk bread roll.

EXAMPLES

The invention is illustrated by the following Examples. In these Examples, the penetrometry value is measured with a model PNR-10 SUR penetrometer with a hemispherical module weighing 148.5 g over a period of 60 seconds at 11° C. (temperature of the product).

Example 1

350 g whole milk are heated to 40° C. and 250 g skimmed milk powder are added thereto. The whole is stirred to obtain a homogeneous mixture with a dry matter content of 47% which is then cooled to approximately 20° C. The cooled mixture is inoculated by addition of 0.25 g microcrystals of β-lactose. The inoculated mixture is then restirred while its temperature is reduced to 10° C. The inoculated mixture is then kept at that temperature for at least 1 hour.

The aqueous phase is then prepared as follows. 600 g of the inoculated mixture are heated to 40° C. 200 g invert sugar having a dry matter content of approximately 75% and 50 g sucrose are then added and, after stirring, 170 g maltodextrin and vanilla flavouring are added. The whole is then restirred to form a homogeneous, smooth mixture which is then pasteurized by heat treatment for 1 minute at 75° C. The mixture is then cooled to approximately 10° C. and 0.25 g microcrystals of β-lactose are added to form the aqueous phase which may be stored at a temperature below 10° C.

The fatty phase is prepared as follows. 540 g fractionated non-hydrogenated fats of vegetable origin containing more than 90% solids at 10° C. and less than 2% solids at 35° C., 320 g butter oil, 120 g cocoa butter and emulsifier are mixed at a temperature of the order of 60° C. to obtain a homogeneous mixture.

The emulsion is then prepared as follows. 800 g of aqueous phase having a dry matter content of 64% are heated to a temperature of 24° C. 200 g of fatty phase are heated to a temperature of 27° C. The aqueous and fatty phases are mixed in an inert gas (nitrogen) atmosphere, the temperature of the mixture being kept at 24° C. The mixture thus obtained is overrun by injection of nitrogen, followed by mechanical action, the temperature being reduced to approximately 14° C. A firm and homogeneous vanilla-flavoured cream is then obtained and may be stored for a few weeks at a temperature of 8° to 15° C.

This vanilla cream has the following characteristics:

| | |
|---|---|
| ● dry matter content | 71% |
| ● pH | 7.0 |
| ● water activity value (Aw) | 0.9 |
| ● fats content | 21% |
| including milk fats | 7.5% |
| ● protein content (of lactic origin) | 7.6% |
| ● ingredients of lactic origin | 53% |
| ● voluminal mass | 560 g/l |
| ● penetrometry (mean value) | 12 mm |
| ● texture and consistency | firm, frothy, smooth and creamy |

This cream may be used as a filling in a quantity of 20 g in a roll weighing 20 to 50 g. This 20 g portion may thus be considered as containing the equivalent of approx. 50 ml whole milk.

Example 2

310 g whole milk to which 220 g skimmed milk powder has been added are heated to 40° C., followed by stirring to obtain a homogeneous mixture with a dry matter content of 47% which is cooled to approximately 20° C. The cooled mixture is inoculated by addition of 0.25 g microcrystals of β-lactose. The inoculated mixture is then restirred, the temperature being reduced to 10° C. The inoculated mixture is then kept at that temperature for at least 1 hour.

The aqueous phase is then prepared as follows. 530 g of the inoculated mixture are heated to 40° C. 200 g invert sugar having a dry matter content of approximately 75% and 50 g sucrose are added and, after stirring, 170 g maltodextrin, vanilla flavouring and 55 g cocoa powder having a fats content of 20–22% are introduced. The whole is then restirred to obtain a homogeneous and smooth mixture which is pasteurized by heat treatment for 1 minute at 75° C. After pasteurization, the mixture is cooled to approximately 10° C. and 0.25 g microcrystals of β-lactose are added to form the aqueous phase which may be stored at a temperature below 10° C.

The fatty phase is prepared as follows. 560 g fractionated non-hydrogenated fats of vegetable origin containing more than 90% solids at 10° C. and less than 2% solids at 35° C, 330 g butter oil, 80 g cocoa butter and emulsifier are mixed at a temperature of approximately 60° C. to obtain a homogeneous mixture.

The emulsion is then prepared as follows. 700 g aqueous phase having a dry matter content of 67% are heated to a temperature of 24° C. 300 g fatty phase are heated to a temperature of 27° C. The aqueous and fatty phases are mixed in an inert gas (nitrogen) atmosphere while the temperature of the mixture is kept at 24° C. The mixture thus obtained is overrun by injection of nitrogen, followed by mechanical action while the temperature of the overrun mixture is reduced to 14° C. A firm, homogeneous chocolate-flavoured cream is obtained in this way and may be stored for a certain time at a temperature of 8° to 15° C.

This chocolate cream has the following characteristics:

| | |
|---|---|
| • dry matter content | 77% |
| • pH | 7.0 |
| • water activity value (Aw) | 0.9 |
| • fats content | 32% |
| • including milk fats | 11% |
| • protein content | 6.6% |
| • including proteins of lactic origin | 5.9% |
| • ingredients of lactic origin | 47% |
| • voluminal mass | 640 g/l |
| • penetrometry (mean value) | 8–10 mm |
| • texture and consistency | firm, frothy, smooth and creamy |

This cream may be used as a filling in a quantity of 20 g in a roll weighing 20 to 50 g. This 20 g portion may thus be considered as containing the equivalent of approximately 38 ml whole milk.

Example 3

A storage test is carried out with two composite products of which one contains 20 g vanilla cream according to Example 1 arranged between two halves of a roll weighing 20 g (product A) while the other contains 20 g chocolate cream containing approximately 20% fats arranged between two halves of a roll weighing 20 g (product B).

The penetrometry value is measured on the cream only while the other measurements are carried out on the composite products.

After storage for 4 weeks at 12° C., the following results are obtained:

| Characteristics | Product A t = 0 | Product A t = 28d | Product B t = 0 | Product B t = 28d |
|---|---|---|---|---|
| pH | 6.8 | 6.7 | 6.7 | 6.7 |
| DM (%) | 74.5 | 74.6 | 76.2 | 75.6 |
| Aw | 0.9 | 0.9 | 0.9 | 0.9 |
| Penetrometry | 10 mm | 9 mm | 7 mm | 7 mm |

DM: Dry matter content
Aw: Water activity
Penetrometry: at 11° C. with a hemispherical module weighing 148.5 g over a period of 60 seconds.

After storage, the cream contained in products A and B has a texture and a firm, smooth and creamy consistency comparable with those of the cream on day 0.

Accordingly, the products according to the invention retain their properties after storage for 4 weeks at 12° C.

We claim:

1. A process for preparing a food product overrun comprising:
   combining whole milk and skimmed milk powder to obtain a milk composition;
   inoculating the milk composition with microcrystalline β-lactose at a temperature of from about 15° C. to about 30° C.;
   admixing the inoculated composition with at least one sugar and heating the sugar-containing composition for a time and at a temperature sufficient to obtain a pasteurized aqueous phase;
   admixing the pasteurized aqueous phase with a fatty phase at a temperature at which the fats in the fatty phase are partly crystallized to obtain an emulsion; and
   overrunning the emulsion to obtain an overrun milk product.

2. A process according to claim 1 wherein the aqueous phase has a dry matter content of from 60% to 70%.

3. A process according to claim 1 wherein the milk composition is inoculated with from 0.03% to 0.05% microcrystalline β-lactose, by weight.

4. A process according to claim 1 wherein, when admixed, the fatty phase is at a temperature of from 26° C. to 29° C. and the aqueous phase is at temperature of from 22° C. to 28° C.

5. A process according to claim 1 wherein the inoculated composition is admixed with a sugar selected from the group consisting of polysaccharide, sucrose and invert sugar.

6. A process according to claim 1 further comprising adding maltodextrin to the inoculated composition, prior to admixture with the fatty phase.

7. A process according to claim 1 further comprising adding whey protein isolate to the inoculated composition, prior to admixture with the fatty phase.

8. A process according to claim 1 further comprising increasing the temperature of the inoculated composition to 30° C. to 50° C. before admixture with the sugar.

9. A process according to claim 1 wherein the aqueous phase is heated for from 45 seconds to 80 seconds at a temperature of from 70° C. to 80° C.

10. A process according to claim 1 further comprising inoculating the pasteurized aqueous phase with microcrystalline β-lactose, before admixture with the fatty phase.

11. A process according to claim 1 wherein the fatty phase comprises non-hydrogenated vegetable fats containing more than 90% solids at 10° C. and less than 2% solids at 35° C.

12. A process according to claim 1 wherein the fatty phase is solid or semisolid at a temperature of up to approximately 10° C. and molten or liquid at a temperature to approximately 35° C.

13. A process according to claim 1 wherein the aqueous phase has a temperature of from 1° C. to 4° C. lower than the temperature of the fatty phase when admixed with the fatty phase.

14. A process according to claim 1 wherein one part by weight fatty phase is admixed with two parts by weight aqueous phase.

15. A process according to claim 1 wherein nitrogen is injected into the emulsion for from 5 minutes to 10 minutes at from 20° C. to 30° C.

16. A process according to claim 15 further comprising mechanically aerating the injected emulsion.

17. A process according to claim 16 wherein the injected emulsion is mechanically aerated at a temperature of from 8° C. to 15° C.

18. A process according to claim 1 wherein the emulsion is overrun such that the resultant overrun milk product has a voluminal mass of from 500 g/l to 600 g/l and a penetrometry value of from 3 mm to 20 mm at 11° C.

* * * * *